United States Patent [19]

Boura

[11] Patent Number: 4,920,800

[45] Date of Patent: May 1, 1990

[54] ACCELEROMETRIC SENSOR WITH PLANE PENDULUM STRUCTURE

[75] Inventor: Andre Boura, Chatellerault, France

[73] Assignee: Societe Francaise d'Equipements pour la Navigation Aerienne, Cedex, France

[21] Appl. No.: 251,606

[22] Filed: Sep. 30, 1988

[30] Foreign Application Priority Data

Oct. 2, 1987 [FR] France .............................. 87 13619

[51] Int. Cl.⁵ .............................................. G01P 15/02
[52] U.S. Cl. .................................................. 73/517 R
[58] Field of Search ........................... 73/517 R, 517 B

[56] References Cited

U.S. PATENT DOCUMENTS

| | | | |
|---|---|---|---|
| 3,636,774 | 1/1972 | Allison | 73/517 R |
| 4,600,934 | 7/1986 | Aine et al. | 73/517 R |
| 4,663,972 | 5/1987 | Gerard | 73/517 B |
| 4,711,128 | 12/1987 | Boura | 73/517 B |

Primary Examiner—John Chapman
Attorney, Agent, or Firm—William A. Drucker

[57] ABSTRACT

An accelerometric sensor according to the invention comprises a plane pendulum structure presenting a test body suspended to a fixed part by at least two parallel blades, flexible in the plane of the said test body, in order to be able to move in translation in the said plane according to a sensitive axis perpendicular to the said blades. This test body comprises a moving support element linked to the said flexible blades and a test mass suspended to the said support element by at least a third and fourth blade parallel to the preceding ones and flexible in the plane of the said test body. The invention enables to reduce substantially the sensitivity to the transverse acceleration of the detection structure when it is submitted to an acceleration directed according its sensitive axis S.

7 Claims, 1 Drawing Sheet

ACCELEROMETRIC SENSOR WITH PLANE PENDULUM STRUCTURE

BACKGROUND OF THE INVENTION

1. Field of the Invention

The invention relates to an accelerometer using an accelerometric sensor having a pendulum structure of the type of those described in U.S. Pat. No. 4,663,972.

According to this patent, U.S. Pat. No. 4,663,972, this pendulum structure is achieved by micro-machining of a substrate consisting in a thin quartz (or any other single crystal) strip and by effecting depositions under vacuum vacuum deposit of suitably arranged conductive surfaces. It comprises a flat moving mass (or test body) suspended on the remaining part of the structure, by means of two parallel thin blades located on both sides of the said mass.

The thickness of these extremely narrow suspension blades is equal to the thickness of the substrate. They enable a translation displacement of the moving mass in a direction parallel to the substrate plane by opposing only a weak elastic return force, so that the sensitive axis of the sensor is located in the substrate plane.

These suspension blades carry conductors which provide an electrical continuity between the metallized areas connected to the moving mass and connecting zones located on the fixed part of the substrate.

This patent further proposes, for the control of the test mass position with respect to the remaining part of the structure, a return motor using the Laplace force obtained by the action of a magnetic induction over a current circulating in at least one coil printed on one of the moving mass faces.

2. Description of the Prior Art

The patent U.S. Pat. No. 4,711,128 filed in the name of the Applicant proposes, for the control of the test mass position with respect to the remaining part of the structure, using of electrostatic forces produced by means of voltages applied to metallic surfaces facing each other.

The specifications of said U.S. patents are incorporated in the present specification by way of reference as essential material thereof. In both cases the S-shaped bending of the two suspending blades in the substrate plane enables a translation movement for the test body, in the direction of the sensitive axis. When the test mass moves away from its equilibrium position, under the effect of the acceleration to be measured, the average direction of the suspending blades is not exactly perpendicular to the initial direction of the sensitive axis.

Therefore, the apparatus is sensitive to the acceleration component which is perpendicular to the initial sensitive axis. In a controlled accelerometer this gives rise, among other effects, to a measurement error known as "vibropendulosity" under dynamic operation. On a non-controlled accelerometer a shifting of the sensitive axis orientation effective with respect to the sensor box is obtained, among other effects.

SUMMARY OF THE INVENTION

The invention concerns an accelerometer using an accelerometric sensor of the above mentioned type, but improved in order to reduce substantially the sensitivity to the transverse acceleration of the detection structure when it is submitted to an acceleration directed according to its input axis. More precisely, this accelerometric sensor comprises a plane pendulum structure presenting a test body suspended to the fixed part by at least a first and a second parallel blade, flexible in the plane of the said test body, in order to enable the translation displacement in the said plane according to a sensitive axis substantially perpendicular to the said blades.

According to the invention the above mentioned test body comprises itself at least a moving support element, linked to the said flexible blades and a test mass suspended to the said support element by at least a third and a fourth blade, parallel to the former ones and flexible in the plane of the said test body.

Advantageously the said third and fourth blades present a length substantially equal to that of the said first and second blades, and are arranged in such a way that in presence of an acceleration according to the said sensitive axis, a compensation of the transverse displacements of the test mass produced by the first and second blade deformations is obtained, due to the displacements in the reverse direction produced by the deformations of the third and fourth blades.

According to another embodiment of the invention, the said test mass is mounted on the fixed part through the link of a symmetrical double suspension which involves two moving support elements each one mounted on the fixed structure by means of two parallel flexible blades and of two pairs of parallel blades linking respectively these two support elements to the test mass.

BRIEF DESCRIPTION OF THE DRAWINGS

Some embodiments of the invention will be described hereafter, by way of non-limitative examples with reference to the annexed drawings in which.

DESCRIPTION OF THE PREFERRED EMBODIMENTS

At first sight it is noteworthy that in these two examples, the accelerometric sensor comprises a plane pendular structure made in one single piece by micro-machining of a crystalline blade, for instance in silicon or in quartz, which can be used on the other hand as a substrate to an integrated electronic circuit.

Figure 1:
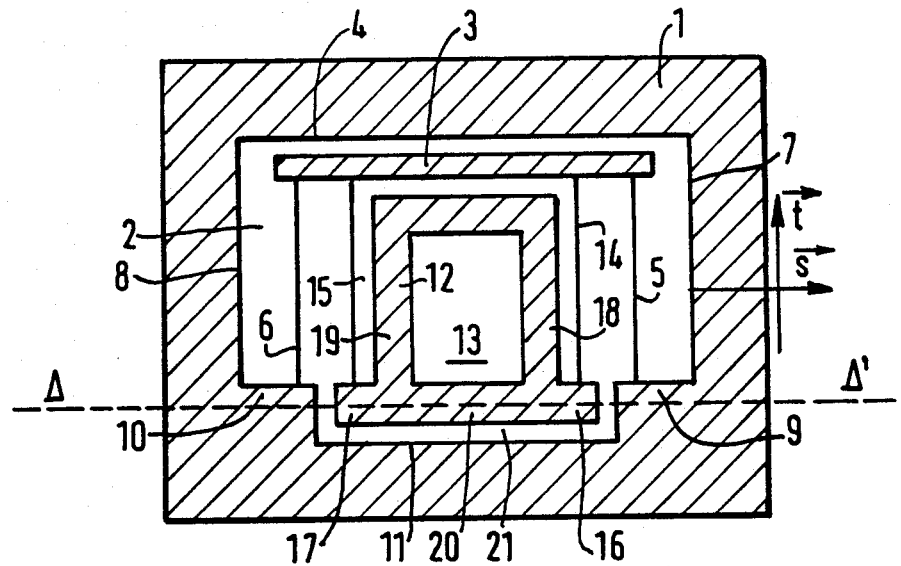
FIG. 1 represents a front view of an accelerometric sensor according to the invention of the simple suspension type.

On the example of FIG. 1, this crystalline blade is machined in order to form an external frame 1 defining a cavity 2 of substantially rectangular form inside which is suspended the test body. This latter comprises first a rod 3 extending inside the cavity 2 parallel and close to one of the longitudinal edges 4 of the frame 1. This rod 3 is suspended by means of two flexible blades 5,6 which extend parallel to the transversal edges 7,8 of the frame 1. These two flexible blades 5,6 link respectively the two end portions of the rod 3 to the two lateral portions 9,10 of the longitudinal edge 11 of the frame 1.

The rod 3 constituted a movable support element on which is suspended a rectangular shaped test mass 12, either or not provided with a central hole 13, the edges of which extend substantially parallel to the edges of the frame 1.

The suspension of this test mass 12 is assured by means of two flexible blades 14,15 parallel to the blades 5,6 which link the rod 3 to two lateral lugs 16,17 provided on the lateral edges 18 and 19 of the mass 12 and which extend in outward projection in the extension of the longitudinal edge 20.

In order that the blades 5,6 and 14,15 present the same length the longitudinal edge 11 of the frame 1 presents, between its lateral portions 9 and 11 a rectangular recess 21 into which is partially driven the test mass 12, in such a way that the fastening points of the flexible blades 5 and 6 on the lugs 16,17 are at the same level as the fastening points of the flexible blades 14,15 on the lateral portions 9,10.

As described hereabove, the test body, constituted by the rod 3, the two flexible blades 14, 15 and the test mass 12, extends thus in the zone included between the two flexible blades 5,6 in accordance with the principle of the accelerometric sensor which is the object of U.S. Pat. No. 4,663,972.

It appears clearly that in presence of an acceleration along the sensitive axis 5 (which is perpendicular to the flexible blades 5,6,14,15) the blades 5 and 6 will be submitted to a bending deformation and will present then an S shape oriented in a first direction, whereas the blades 14 and 15, submitted also to a bending deformation will present an S shape oriented in a second direction opposite to the first one.

In parallel, the relative displacement of the test mass 12 with respect to the rod 3 in the transverse direction t, perpendicular to the sensitive axis S, produced by the deformation of the flexible blades 14, 15 will be compensated by a correlative displacement of the rod 3 with respect to the frame 1, produced by the deformations of the flexible blades 5,6. In this case a cancellation of the displacements of the test mass 12 with respect to the frame 1 in the transverse direction t is thus obtained.

On the other hand, if besides an acceleration in the transverse direction $\vec{t}$ is applied to the whole assembly of the accelerometric sensor, the bending of blades 5 and 6 is increased whereas that of the blades 14 and 15 is decreased. An adequate sizing of the suspending blades and of the suspended bodies (rod 3 and test mass 12) enables to reach a displacement of the mass 12 in the direction $\vec{S}$ substantially nil. This constitutes the essential condition which has to be fulfilled in order that the accelerometric sensor should be insensitive to the acceleration component directed according to the $\vec{t}$ axis.

Figure 2:
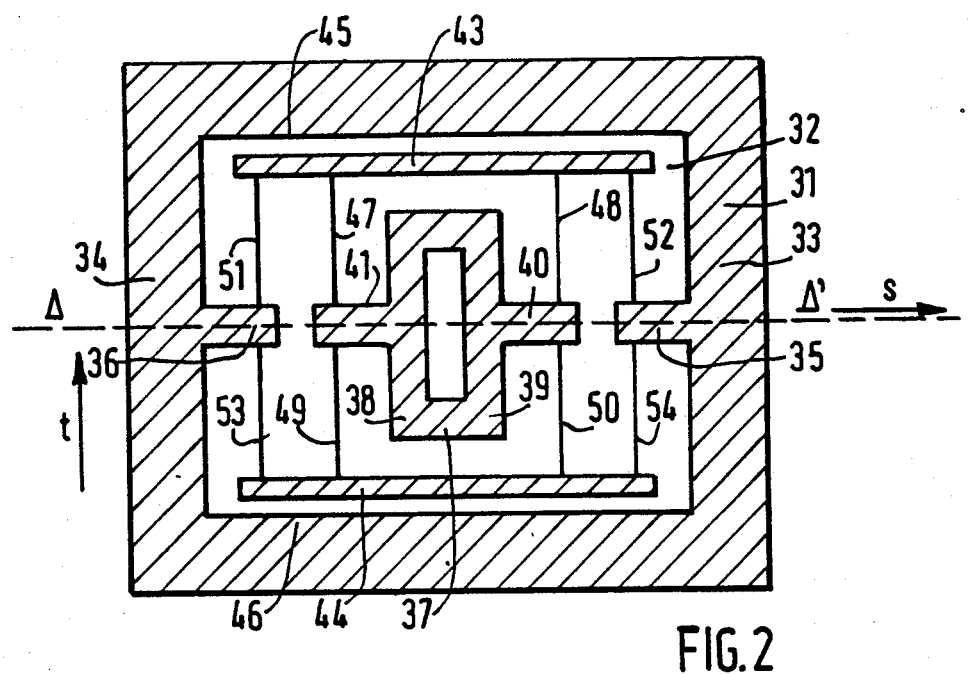
FIG. 2 is a similar view of an accelerometric sensor of the double symmetrical suspension type.

These various results may also be obtained by means of the accelerometric sensor represented on FIG. 2, in which the test mass is carried by a double symmetrical suspension and where the structure of the said test mass is obtained by a symmetrizing of the sensor shown on FIG. 1 with respect to the symmetry axis ΔΔ'.

According to this embodiment, the frame 31 defines a cavity 32 of substantially rectangular form and presents two lateral edges 33,34 provided respectively in their central regions with two rectangular shaped inwardly directed protuberances or strips 35, 36 which extend according to the ΔΔ' axis.

As to the test mass 37, it presents a rectangular shape the lateral edges of which 38,39 are provided in their median regions, with two respective protuberances or strips 40, 41 which extend in projection in line with the protuberances or strips 35, 36.

This test mass 37 is suspended to two rods 43,44 which extend in parallel to the longitudinal edges 45,46 of the frame 31, on each side of the mass 37 by means of four flexible blades, vizus:

two flexible blades 47,48 linking the two strips 40,41 to the rod 43 and two flexible blades 49,50 linking the two strips 40,41 to the rod 44.

The rod 43 is suspended to the frame 31 by means of two flexible blades 51,52 linking respectively its two end portions to the two strips 35 and 36.

In the same way, the rod 44 is suspended to the frame 31 by means of two flexible blades 53,54 linking respectively its two end portions to the two strips 35 and 36.

In this example, at rest, the flexible blades 47 to 54 are all parallel to the transverse axis t and present the same length. The test mass 37 is located in the space defined by the four blades 47 to 50 which support it (and no more between two blades as described previously).

The principle of operation of this accelerometric sensor is similar to the previous one, each of the two suspensions having on the test body an identical effect.

It will be observed that in the first mode of construction, an effective stiffness of the suspension is obtained in the direction of the sensitive axis S twice as weak as in the construction modes described in U.S. Pat. No. 4,663,972 all things being equal in other respects (i.e. for fixed dimensions of the blades and of the test mass). This advantage does not exist in the second mode of construction, although this drawback is compensated by a better symmetrizing of the efforts.

What is claimed is:

1. An accelerometer sensor comprising a pendulum structure having a planar test body suspended on a fixed part by at least first and second parallel blades, flexible in the plane of the said test body, so that the planar test body is able to move in translation in the said plane according to a sensitive axis substantially perpendicular to the said blades, wherein the planar test body comprises a moving support element linked to the said flexible blades and a planar test mass suspended to the said support element by at least third and fourth blades parallel to the above mentioned ones and flexible in the plane of the said test body.

2. An accelerometric sensor as claimed in claim 1, wherein the said third and fourth blades present a length substantially equal to that of the said first and second blades and are arranged in such a way that in presence of an acceleration according to the said sensitive axis a compensation of the transverse displacements of the test mass produced by the deformations of the first and second blades is obtained, due to displacements in opposite directions produced by deformations of the third and fourth blades.

3. An accelerometric sensor as claimed in claim 1, wherein the said pendulum structure is achieved by means of a crystalline blade machined in such a way as to constitute an external frame having two longitudinal edges and defining a cavity inside which is suspended the said test body.

4. An accelerometric sensor as claimed in claim 3, wherein the said cavity presents a substantially rectangular shape having a longitudinal axis, the said test body comprises a rod extending parallel to the said longitudinal axis and whose end portions are connected to one of the longitudinal edges of the frame by first and second flexible blades perpendicular to the said axis, and on the said rod a test mass is suspended by means of a third and fourth flexible blades parallel to the first two ones, the assembly contituted by this test mass and by the third and fourth flexible blades extending at least partially in the volume included between the two first flexible blades.

5. An accelerometric sensor as claimed in claim 4, wherein the said longitudinal edge comprises two lateral portions on which are respectively fastened the first two flexible blades and a central recess into which the test mass extends partially in order that the fastening points of the third and fourth flexible blades on the said test mass are at the same level as the fastening points of the two first blades on the said lateral portions.

6. An accelerometric sensor as claimed in claim 1, wherein the said test mass is mounted on the fixed part through the link of a double symmetrical suspension comprising two moving support elements each one mounted on the structure by means of two parallel flexible blades and two pairs of parallel blades linking respectively these two support elements to the test mass.

7. An accelerometric sensor as claimed in claim 6, characterized in that the said pendulum structure is achieved by means of a machined crystalline blade in order to constitute an external frame defining a recess of substantially rectangular shape the lateral edges of which present two inwardly directed strips extending substantially according to the symmetry longitudinal axis of the recess and in that the said test mass presents a substantially rectangular shape and is provided with two lateral strips located in line with the said inward strips, in that said mass is suspended to two longitudinal rods located on each side of the said mass through the link of four transversal flexible blades fastened to the said lateral strips and in that the said rods are each one suspended on the frame by means of two flexible blades respectively fastened to the said inward strips.

* * * * *